United States Patent [19]

Wolf et al.

[11] Patent Number: 5,701,050
[45] Date of Patent: Dec. 23, 1997

[54] IMMERSION LAMP FOR A PHOTOCHEMICAL REACTOR AND ITS USE

[75] Inventors: Christoph Wolf, Mainhausen; Manfred Daus, Biebergemünd, both of Germany

[73] Assignee: Heraeus Noblelight GmbH, Hanau, Germany

[21] Appl. No.: 481,432

[22] PCT Filed: Jan. 28, 1994

[86] PCT No.: PCT/EP94/00241

§ 371 Date: Jun. 15, 1995

§ 102(e) Date: Jun. 15, 1995

[87] PCT Pub. No.: WO94/20418

PCT Pub. Date: Sep. 15, 1994

[30] Foreign Application Priority Data

Mar. 12, 1993 [DE] Germany .......................... 43 07 884.2

[51] Int. Cl.$^6$ .................. H01J 61/34; C02F 1/32
[52] U.S. Cl. .................. 313/25; 313/567; 313/318.05; 313/318.1; 313/27; 362/219; 422/24; 250/436; 439/602; 439/611
[58] Field of Search .................. 313/567, 25, 318.01, 313/318.1, 318.05, 1, 22, 27, 24, 30, 35, 51; 362/225, 224, 230, 219; 422/24, 301, 905; 250/436; 439/220, 226, 602, 611; 210/748

[56] References Cited

U.S. PATENT DOCUMENTS 2,963,603 12/1960 Germer ...................... 313/25 X
3,617,701 11/1971 Volker ...................... 219/523
5,334,905 8/1994 Ullrich ...................... 313/25 X

FOREIGN PATENT DOCUMENTS 4 555 789  5/1991  Australia.
855 397  12/1950  Germany.
9 001 582  2/1992  Netherlands.

OTHER PUBLICATIONS

Patent Abstracts of Japan, vol. 15, No. 512 (C-0898) 1991 of JP-1-03 224 675.
Heraeus Original Hanau D 310625/2C 9.89/VN Pk of W. C. Heraeus GmbH; Sep. 1989.

*Primary Examiner*—Ashok Patel
*Attorney, Agent, or Firm*—Frishauf, Holtz, Goodman, Langer & Chick, P.C.

[57] ABSTRACT

An immersion lamp for a photochemical reactor with a discharge tube fitted in an outer bulb through which an inert gas flows having a lamp bulb with axially opposite mechanically stable electric terminals is held and contacted in a holder in the outer bulb, and the outer bulb is tubular and has at least one open end projecting into a hollow space in a connector head to provide electric contact and a secure mechanical support; the open end of the outer bulb is surrounded by at least one elastic seal which is surrounded axially by two inelastic metal plates laid on it having cut-outs for the passage of the end of the outer bulb and screws; the pressure exerted by said screws deforms the elastic seal radially to such an extent that it seals against both the outer wall at the end of the outer bulb and the inner wall of the hollow space and secures the outer bulb centrally in the connection head.

15 Claims, 3 Drawing Sheets

5,701,050

IMMERSION LAMP FOR A PHOTOCHEMICAL REACTOR AND ITS USE

FIELD OF THE INVENTION

The invention relates to an immersion lamp for a photochemical reactor with a discharge lamp, wherein the discharge lamp is seated in an exterior bulb through which an inert gas flows and has a lamp bulb with axially oppositely located, mechanically stable electrical connectors, which is held in and connected with a socket of the exterior bulb, wherein the exterior bulb is tube-shaped and has at least one open end and projects into a chamber of a connecting head for electrical connection and secure mechanical support, and its use.

BACKGROUND OF THE INVENTION

An immersion lamp in accordance with the structural system containing an Hg high-pressure radiator is recited on page 13 of the prospectus Heraeus Original Hanau D 310625/2C 9.89/VN PK of W. C. Heraeus GmbH. As can be seen in FIG. 8, the radiator is fastened in the immersion tube by means of straps and seals via a radiator support with a lead, wherein the immersion tube in turn is located in a cooling tube with straps and seals. In this case the immersion tube is flooded with an inert gas via an inlet connector and an outlet connector at the head plate. The cooling tube offers the opportunity of water cooling between the immersion tube and the reaction material. The connection between the head plate or immersion lamp head, as well as the connection of the immersion tube, with the cooling tube takes place via normal flange connections.

An immersion lamp with a mercury high pressure radiator is furthermore known from DE-PS 855 397, which is housed in the interior of an outer bulb closed at one end and wherein the area intended for the radiation to exit consists of transparent quartz glass and its remaining areas of opaque quartz glass. The exterior bulb is sealingly fixed in an opening of the wall of the radiation vessel by means of a circumferential packing box seal; the exterior bulb is closed off by means of a box-shaped connecting head with a current allocation and a cooling air connection, wherein the connecting head is fastened by means of straps at the upper end of the exterior bulb.

Assembly in case of changing the exterior bulb or the discharge lamp has been shown to entail problems because in this case it is necessary to handle straps and seals especially carefully to assure sufficient stability and sealing.

Furthermore, U.S. Pat. No. 3,617,701 describes an electrical heating element which is surrounded by a quartz glass tube closed off on one side to form an immersion tube and is sealingly maintained with its open end in a connecting head by means of an epoxy resin adhesive.

Here, too, assembly or exchange of the quartz glass tube entail problems because of the adhesion, since great skilled efforts are required to achieve sufficient stability and sealing.

SUMMARY OF THE INVENTION

It is the object of the invention to provide a mechanically rigid, sealing and clamping mounting on an open end of an outer bulb of an immersion lamp, wherein the mounting is intended to make simple assembly possible, in particular in the course of changing the exterior bulb or exchanging the discharge lamp.

This object is attained by the present invention.

Preferred embodiments of the invention as well as its use are recited in the dependent claims.

It has been shown to be advantageous that the seal consists of module-like elements so that it is possible, depending on the length of the radiator or the flow pressure acting on the exterior bulb, to achieve an optimal adaptation with sufficient stability by means of individual or several module-like sealing elements. A further advantage is to be considered that a quick change of the exterior bulb or the discharge lamp can be performed by doing away with the setting times of adhesives.

BRIEF DESCRIPTION OF THE DRAWINGS

The subject of the invention will be explained in detail by means of FIGS. 1, 2 and 3.

DETAILED DESCRIPTION OF THE INVENTION

Figure 1:
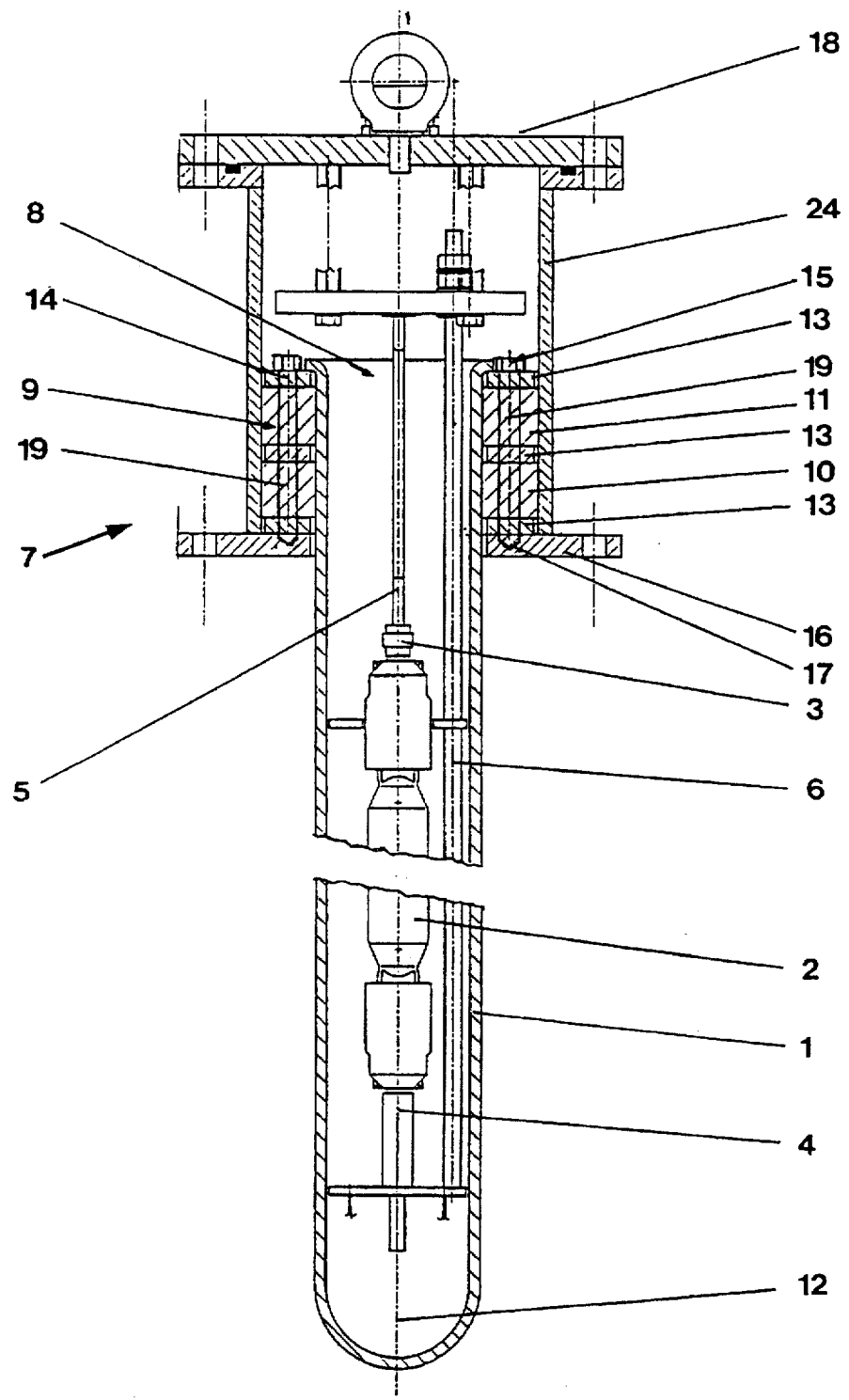
FIG. 1 is an elevational, broken-sectional view which shows an immersion lamp with an inserted radiator lamp in longitudinal section.

In accordance with FIG. 1, the immersion lamp has an exterior bulb 1, in whose interior the discharge lamp 2 is located and is electrically and mechanically connected with the contact device in the connecting head 7 via the contacts 3 and 4, as well as the associated guide and contact rods 5 and 6. The open end 8 of the exterior bulb 1, closed off at one end, projects into a hollow chamber 9 of the connecting head 7 which, in the shape of a hollow cylinder, is provided with a greater interior diameter than the exterior diameter of the also cylindrically formed open end 8 of the exterior bulb 1. Two sealing bodies 10 and 11 are placed coaxially with the axis 12 of the exterior bulb 1 between the interior wall of the hollow chamber 9 and the upper end 8 wherein, viewed in the axial direction, the sealing bodies 10 and 11 are each surrounded by ring-shaped inelastic plates 13, wherein these plates are provided with openings for passing through the exterior bulb and threaded bolts, as shown below in FIG. 3. The threaded bolts are inserted along the schematically represented dashed lines 14 and 15 and subsequently fastened by means of a nut placed thereon or by screwing them into the lower flange 16 of the connecting head 7 in such a way that the sealing bodies 10 and 11 are deformed because of the pressure exerted along the axis 12, i.e. in the radial direction, so that they sealingly rest on the interior wall of the hollow chamber 9, as well as on the exterior wall of the open end 8 of the exterior bulb 1, and simultaneously form a secure mounting or centering of the exterior bulb because of their resilience. It is assured in this way that even a comparatively long exterior bulb is stably maintained in its centered position under the pressure of flow of the medium surrounding it.

As can be seen by means of FIG. 1, the ring-shaped plates 13 are adjusted in the flange 16, preferably by a thread 17, in such a way that the ring-shaped inelastic plates 13 are always maintained at a distance from the interior wall of the hollow chamber 9, as well as the upper end 8 of the connecting bulb 1, while the sealing bodies 10 and 11, which extend inward and outward in the radial direction, touch the upper end 8, as well as the interior wall of the hollow chamber 9 sealingly and with sufficient mechanical stability. The threaded bolts 19, only shown schematically in FIG. 1, are inserted from above through the openings 14, 15 prior to the placement of the head plate 18 of the connecting head 7 and screwed together with the flange 16 by means of the threads 17. A comparatively simple change of the exterior bulb 1 or the discharge lamp 2 is possible in this way, since it is necessary to remove only the head plate 18 from the connecting head 7 for disassembly and to loosen the screws along the represented lines 15 and 15 sufficiently so that the compressive force on the sealing bodies is removed, in the course of which the upper end 8 of the exterior bulb 1 can be removed in a simple way in respect to the connecting head 7 and can be pulled out toward the top, for example.

Figure 2:
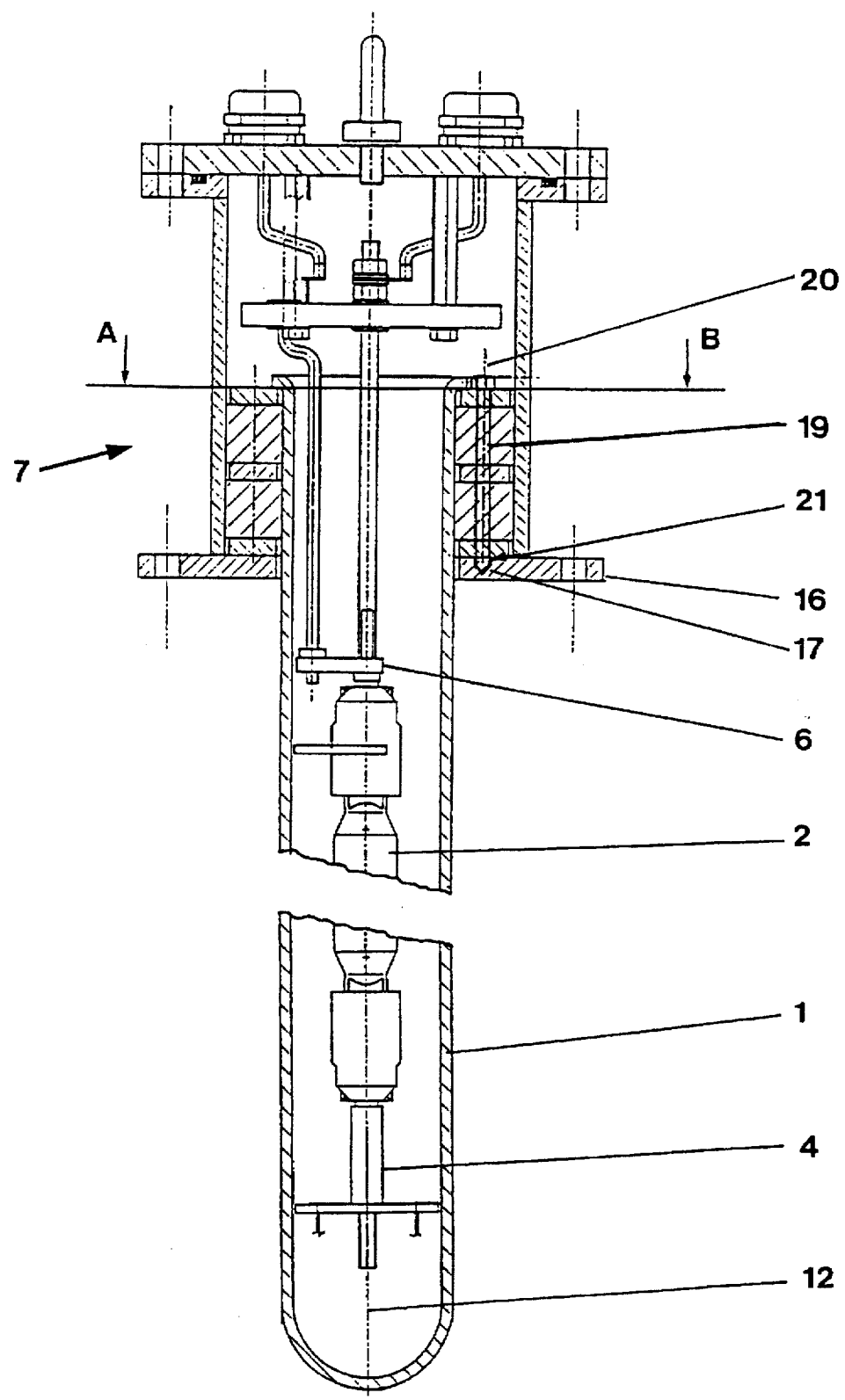
FIG. 2 is an elevational, broken-sectional view which shows a longitudinal section of the immersion lamp turned by 90°, with respect of FIG. 1.

FIG. 2 shows a longitudinal section, turned by 90°, of the immersion lamp illustrated by means of FIG. 1, wherein the same reference numerals as FIG. 1 have been kept to the extent possible, so that a detailed explanation is not necessary FIG. 2 shows the insertion of the threaded bolt along a schematically represented line for improved clarity, wherein the thread 21 of the threaded bolt 19 is screwed into a blind bore-like thread 17. The employment of a blind bore-like thread is necessary for obtaining the sealing of the flange 16 of the connecting head 7 against the fluid located under it.

As will be explained below by means of FIG. 3, the open end 8 of the exterior bulb 1 is surrounded by a plurality of such threaded bolts 19, which also is true for the connection long the lines 14 and 15 in FIG. 1.

Figure 3:
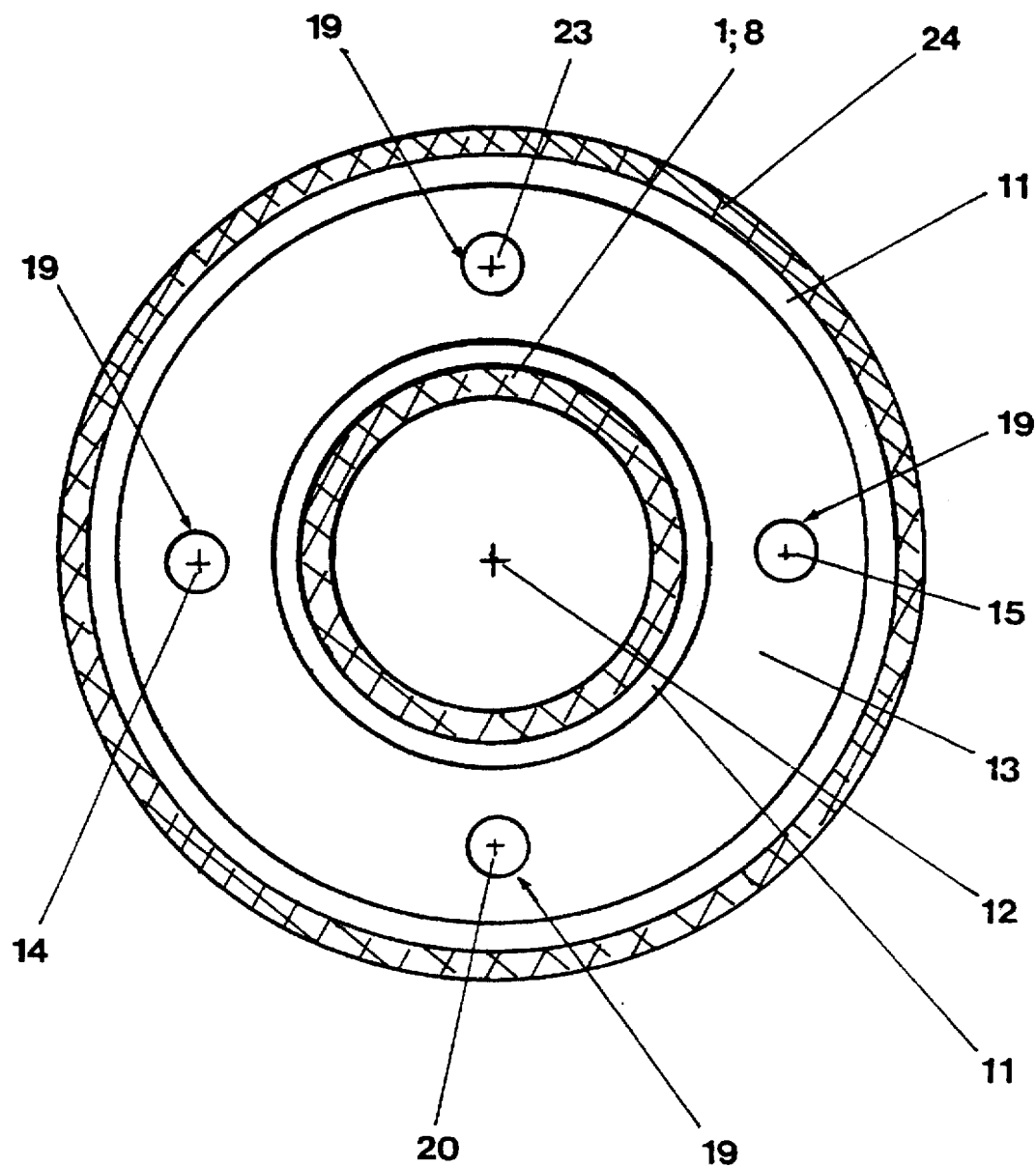
FIG. 3 shows a top plan view of the sealing body.

FIG. 3 shows a top view along a section A–B of FIG. 2 of the sealing element consisting of ring-shaped plates 13 and sealing bodies 10 and 11.

The ring-shaped inelastic plate 13 resting on the upper sealing body 11 can be seen in the top view of FIG. 3, which also has the openings 14, 15 leading through the sealing body along the lines 20 and 23, of which the heads of the bolts 19 projecting above the respective opening are visible. The sealing body 11, which extends by means of pressure sealing in the radial direction, can be seen underneath the ring-shaped inelastic plate 13 and rests resiliently sealing against the upper end 8 of the exterior bulb 1 represented in section, and rests in the radial exterior direction against the interior wall of the hollow chamber 9, wherein the wall surrounding the hollow chamber is identified by the reference numeral 24.

In the compressed state of the sealing body(ies), the interior diameter of the inelastic plates is always larger than that of the sealing bodies, while the exterior diameter of the plates in the compressed state is always less. The ratio of the thickness of the inelastic plates to the thickness of the sealing bodies is in the range of 1:2 to 1:10, preferably in the range of 1:3.5.

VA steel has particularly proven itself as a material for the inelastic plates, while the sealing bodies preferably consist of an acid-free, UV-resistant resilient material, such as Viton.

We claim:

1. An immersion lamp for a photochemical reactor comprising:

a discharge lamp (2) connected to a connecting head (7) formed with a hollow chamber (9), the discharge lamp (2) being seated in an exterior bulb (1), an inert gas being disposed within the exterior bulb (1);

the discharge lamp (2) having axially oppositely located, mechanically stable electrical connectors 5, 6 held in and connected with a socket of the exterior bulb and extending into said hollow chamber (9), the exterior bulb (1) being tube-shaped and having at least one open end (8) which projects into the hollow chamber (9) of the connecting head (7), wherein the at least one open end (8) of the exterior bulb (1) is surrounded by at least one resilient sealing member (10, 11) which, when viewed in the axial direction, is enclosed by two inelastic plates (13) placed thereupon in the form of a sandwich, the two inelastic plates (13) have openings which accommodate threaded bolts (19) having threaded ends which pass therethrough;

the connecting head (7) at a lower end thereof has a flange (16) with a passage for the at least one open end (8) of the exterior bulb (1), the flange (16) being provided with blind bore openings (17) with internal threads for receiving the threaded ends of the threaded bolts (19), the blind bare openings (17) being disposed on a side of the flange (16) facing away from the discharge lamp (2), wherein the at least one resilient sealing member (10, 11) is deformed by compression by the threaded bolts (19) in the radial direction such that the at least one the resilient sealing member (10, 11) rests sealingly against an exterior wall of the at least one open end (8) of the exterior bulb (1), as well as against an interior wall of the hollow chamber (9) to fix the exterior bulb (1) substantially in the center of the connecting head (7).

2. The immersion lamp in accordance with claim 1, wherein one of said two inelastic plates (13) is disposed between at least two of said at least one resilient sealing members (10, 11) and said at least two of said at least one sealing member (10, 11) are axially disposed in respect to each other along a lonqitudinal axis of the exterior bulb (1).

3. The immersion lamp in accordance with claim 2, wherein the interior wall of the hollow space (9) is formed as a hollow cylinder in an area of the connecting head (7) wherein the at least one resilient sealing member (10, 11) and the two inelastic plates (13) are disposed.

4. The immersion lamp in accordance with claim 3, wherein the exterior bulb (1) consists of a tube closed off at one end.

5. The immersion lamp in accordance with claim 3, wherein each opposite end of the exterior bulb (1) is an open end which is connected to, centered therein and sealed by the connecting head (7).

6. The immersion lamp in accordance with claim 1, wherein the interior wall of the hollow space (9) is formed as a hollow cylinder in an area of the connecting head (7) wherein the at least one resilient sealing member (10, 11) and the two inelastic plates (13) are disposed.

7. The immersion lamp in accordance with claim 1, the exterior bulb (1) consists of a tube closed off at one end.

8. The immersion lamp in accordance with claim 1, wherein each opposite end of the exterior bulb (1) is an open end which is connected to, centered therein and sealed by the connecting head (7).

9. The immersion lamp in accordance with claim 1, wherein a ratio of the thickness of each of the two inelastic plates (13) to the thickness of the at least one resilient sealing member (10, 11) is 1:2 to 1:10.

10. The immersion lamp in accordance with claim 9, wherein the ratio is 1:3.5.

11. The immersion lamp in accordance with claim 1, wherein the two inelastic plates (13) are made from steel.

12. The immersion lamp in accordance with claim 11, wherein the at least one resilient sealing member (10, 11) is made of an acid-free, UV-resistant material.

13. The immersion lamp in accordance with claim 12, wherein a ratio of the thickness of each of the two inelastic plates (13) to the thickness of the at least one resilient sealing member (10, 11) is 1:2 to 1:10.

14. The immersion lamp in accordance with claim 13, wherein the ratio is 1:3.5.

15. The immersion lamp in accordance with claim 1, wherein the at least one sealing member is made of an acid-free, UV-resistant material.

* * * * *